United States Patent
Lindbom et al.

(10) Patent No.: US 8,868,089 B2
(45) Date of Patent: Oct. 21, 2014

(54) METHOD AND ARRANGEMENT IN A TELECOMMUNICATION SYSTEM

(75) Inventors: Lars Lindbom, Karlstad (SE); George Jöngren, Stockholm (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/393,730

(22) PCT Filed: Mar. 31, 2011

(86) PCT No.: PCT/SE2011/050373
§ 371 (c)(1),
(2), (4) Date: Mar. 1, 2012

(87) PCT Pub. No.: WO2012/064249
PCT Pub. Date: May 18, 2012

(65) Prior Publication Data
US 2012/0165029 A1  Jun. 28, 2012

Related U.S. Application Data

(60) Provisional application No. 61/411,693, filed on Nov. 9, 2010.

(51) Int. Cl.
| | |
|---|---|
| H04W 72/00 | (2009.01) |
| H04L 5/00 | (2006.01) |
| H04B 7/04 | (2006.01) |
| H04L 1/00 | (2006.01) |
| H04W 4/00 | (2009.01) |
| H04L 12/28 | (2006.01) |
| H04W 16/32 | (2009.01) |

(52) U.S. Cl.
CPC ............... *H04L 5/00* (2013.01); *H04W 72/00* (2013.01); *H04B 7/04* (2013.01); *H04L 1/0026* (2013.01); *H04W 16/32* (2013.01); *H04L 5/0032* (2013.01); *H04L 5/0057* (2013.01)
USPC ............ 455/450; 370/328; 370/252; 370/329

(58) Field of Classification Search
USPC ........................................................ 455/450
See application file for complete search history.

(56) References Cited

U.S. PATENT DOCUMENTS

| | | | |
|---|---|---|---|
| 2009/0257390 | A1 | 10/2009 | Ji et al. |
| 2009/0270108 | A1 | 10/2009 | Xu |
| 2010/0202311 | A1 | 8/2010 | Lunttila et al. |
| 2012/0076017 | A1* | 3/2012 | Luo et al. ............... 370/252 |
| 2012/0134275 | A1* | 5/2012 | Choi et al. ............. 370/241 |

FOREIGN PATENT DOCUMENTS

| | | | |
|---|---|---|---|
| EP | 2239975 A1 * | 1/2009 | |
| WO | 2009/123549 A2 | 10/2009 | |

OTHER PUBLICATIONS

MediaTek Inc., "Time SHifting and Almost Blank Subframe for Intercell Interference Coordination", 3GPP TSG-RAN WG1 # 62, Aug. 23, 2010.*
MediaTek Inc., "eICIC of PCFICH and PDCCH in MeNB Plus HeNBs Deployment", 3GPP TSG-RAN WG1 # 61, Jul. 2, 2010.*
3rd Generation Partnership Project. "On Details of Restricted CSI Measurements." 3GPP TSG-RAN WG1#63, R1-105879, Jacksonville, FL, US, Nov. 15-19, 2010.
3rd Generation Partnership Project. "Draft LS on CSI Measurements on Restricted Subframes for eICIC." 3GPP TSG-RAN WG1 #63, R1-106515, Jacksonville, FL, US Nov. 15-19, 2010.

* cited by examiner

*Primary Examiner* — Timothy Pham
(74) *Attorney, Agent, or Firm* — Murphy, Bilak & Homiller, PLLC

(57) ABSTRACT

A method and an arrangement (800) in a user equipment (420) for reporting Channel State Information, CSI, and a method and an arrangement (1000) in a base station (410) for obtaining CSI are provided. The user equipment (420) is in connection with the base station (410) in a cellular communication network (400). After receiving a receiving (702) a grant in a subframe n to be used for CSI reporting, from the base station, the user equipment determines (703) subframe type of a subframe n+p. The user equipment then reports (704) to the base station, CSI reflecting channel conditions in the subframe type of subframe n+p. p is a variable value.

20 Claims, 8 Drawing Sheets

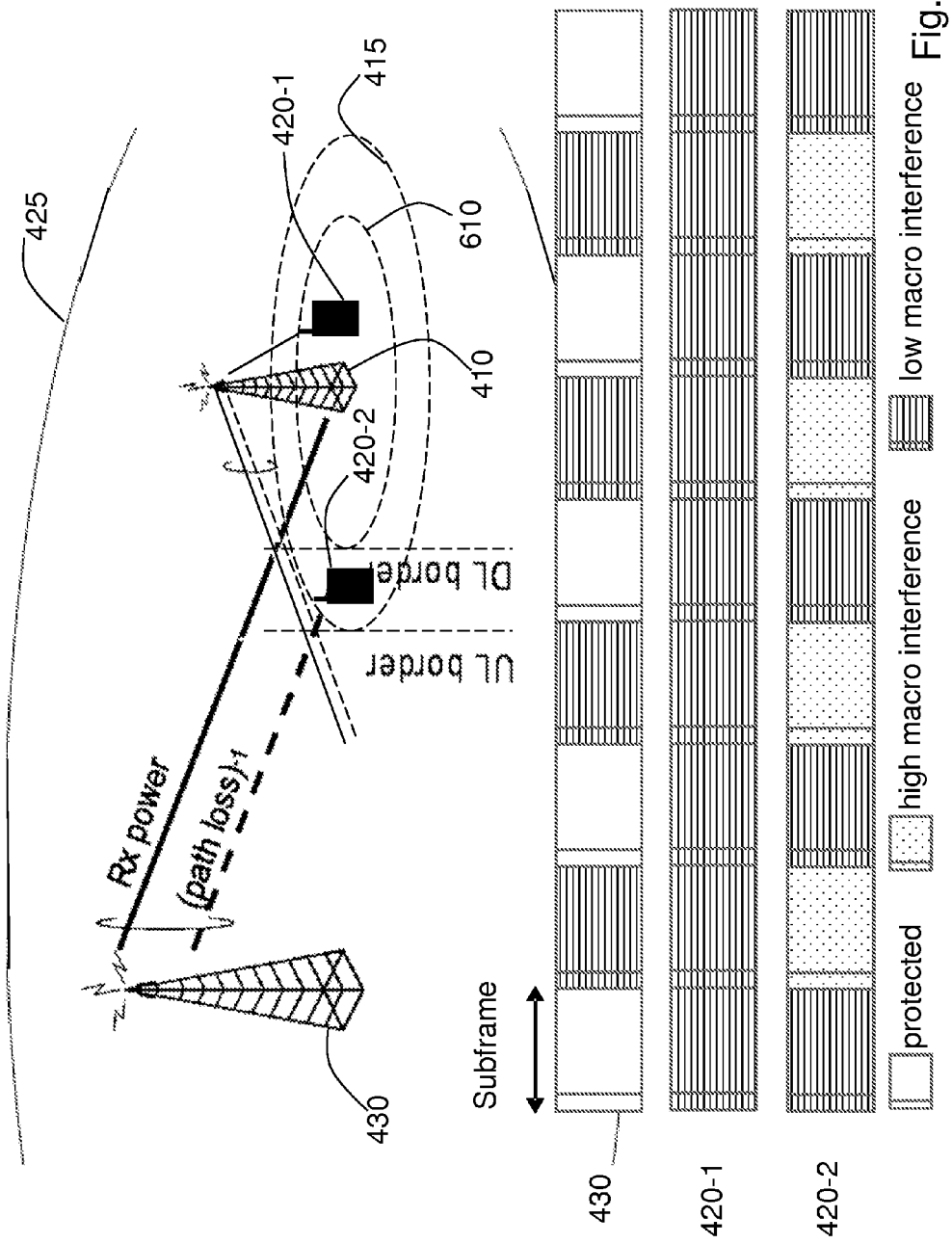

METHOD AND ARRANGEMENT IN A TELECOMMUNICATION SYSTEM

TECHNICAL FIELD

Embodiments herein relate to a method and an arrangement in a user equipment, and a method and an arrangement in a base station. In particular, it relates to reporting channel state information.

BACKGROUND

Communication devices such as mobile stations are also known as e.g. mobile terminals, wireless terminals and/or User Equipments (UEs). Mobile stations are enabled to communicate wirelessly in a cellular communications network or wireless communication system, sometimes also referred to as a cellular radio system. The communication may be performed e.g. between two mobile stations, between a mobile station and a regular telephone and/or between a mobile station and a server via a Radio Access Network (RAN) and possibly one or more core networks, comprised within the cellular communications network.

Mobile stations may further be referred to as user equipments, terminals, mobile telephones, cellular telephones, or laptops with wireless capability, just to mention some further examples. The mobile stations in the present context may be, for example, portable, pocket-storable, hand-held, computer-comprised, or vehicle-mounted mobile devices, enabled to communicate voice and/or data, via the radio access network, with another entity, such as another mobile station or a server.

The cellular communications network covers a geographical area which is divided into cell areas, wherein each cell area is served by a base station, e.g. a Radio Base Station (RBS), which sometimes may be referred to as e.g. eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the mobile stations within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for mobile stations. The 3GPP has undertaken to evolve further the UTRAN and GSM based radio access network technologies. The evolution of UTRAN is commonly referred to as the Evolved-UTRAN (E-UTRAN) or LTE.

In the context of this disclosure, the expression DownLink (DL) is used for the transmission path from the base station to the mobile station. The expression UpLink (UL) is used for the transmission path in the opposite direction i.e. from the mobile station to the base station.

Improved support for heterogeneous network operations is part of the ongoing enhancements of LTE specification of 3GPP LTE Rel-10. In heterogeneous networks, a mixture of cells of differently sized and overlapping coverage areas are deployed. One example of such deployments is where pico cells are deployed within the coverage area of a macro cell. A pico cell is a small cellular base station typically covering a small area. Thus, the small cellular base station transmits at a low power. Accordingly, the small cellular base station may be referred to as a low power node. Other examples of low power nodes in heterogeneous networks are home base stations and relays. As will be discussed in the following, the large difference in output power, e.g. 46 dBm in macro cells and less than 30 dBm in pico cells, results in a different interference situation than what is seen in networks where all base stations have the same output power.

The aim of deploying low power nodes such as pico base stations within the macro coverage area is to improve system capacity by means of cell splitting gains as well as to provide users with wide area experience of very high speed data access throughout the network. Heterogeneous deployments are in particular effective to cover traffic hotspots, i.e. small geographical areas with high user densities served by e.g. pico cells, and they represent an alternative deployment to denser macro networks.

FIG. 1 depicts an example of macro and pico cell deployment in a heterogeneous network 100 comprising a macro cell 110 and three pico cells 120. The most basic means to operate a heterogeneous network is to apply frequency separation between the different layers, i.e. between the macro cell 110 and the pico cells 120 in the heterogeneous network 100 in FIG. 1. The frequency separation between the different layers is obtained by allowing the different layers to operate on different non-overlapping carrier frequencies. In this manner, any interference between the layers of cells is avoided. With no macro cell interference towards the pico cells 120 in FIG. 1, cell splitting gains are achieved when all resources can simultaneously be used by the pico cells. The drawback of operating layers on different carrier frequencies is that it may lead to resource-utilization inefficiency. For example, with low activities in the pico cells 120, it may be more efficient to use all carrier frequencies in the macro cell 110 and then basically switch off the pico cells 120. However, the split of carrier frequencies across layers is typically performed in a static manner.

Another related means to operate a heterogeneous network is to share radio resources on same carrier frequencies by coordinating transmissions across macro and pico cells. This type of coordination refers to as Inter-Cell Interference Coordination (ICIC) in which certain radio resources are allocated for the macro cells during some time period whereas the remaining resources can be accessed by the pico cells without interference from the macro cell. Depending on the traffic situations across the layers, this resource split can change over time to accommodate different traffic demands. In contrast to the above mentioned split of carrier frequencies, this way of sharing radio resources across layers can be made more or less dynamic depending on the implementation of the interface between nodes in the heterogeneous network. In LTE, an X2 interface has been specified in order to exchange different types of information between base station nodes. One example of such information exchange is that a base station can inform other base stations that it will reduce it's transmit power on certain resources.

Time synchronization between base station nodes is required to ensure that ICIC across layers will work efficiently in heterogeneous networks. This is in particular of importance for time domain based ICIC schemes where resources are shared in time on same carrier.

LTE uses Orthogonal Frequency Division Multiplexing (OFDM) in the downlink and Discrete Fourier Transform spread OFDM (DFT-spread OFDM) in the uplink. In OFDM transmissions, set of modulated symbols is transmitted over narrowband and orthogonal subcarriers, where the number of subcarriers defines the transmission bandwidth of the ODFM signal. In DFT-spread OFDM, the set of modulated symbols is first pre-coded before generating the OFDM signal, where the pre-coding aim to provide power characteristics of the OFDM signal suitable for transmit power limited terminals. A basic LTE physical resource can thus be seen as a time-frequency grid as illustrated in FIG. 2, where each resource element corresponds to one subcarrier during one OFDM symbol interval. Part of the OFDM symbol interval is a cyclic prefix introduced to mitigate inter-symbol interference. LTE supports two cyclic prefix lengths, commonly referred to as the normal and extended cyclic prefix, respectively.

In the time domain, LTE downlink transmissions are organized into radio frames of 10 ms, each radio frame comprising ten equally-sized subframes of 1 ms. A subframe is divided into two slots, each of 0.5 ms time duration. Each slot comprises of either 6 or 7 OFDM symbols depending on the selected cyclic prefix length.

The resource allocation in LTE is described in terms of resource blocks, where a resource block corresponds to one slot in the time domain and 12 contiguous 15 kHz subcarriers in the frequency domain. Two in time consecutive resource blocks represent a resource block pair and corresponds to the time interval upon which scheduling operates.

Transmissions in LTE are dynamically scheduled in each subframe where the base station transmits assignments and/or grants to certain user equipments via the Physical Downlink Control Channel (PDCCH). The PDCCHs are transmitted in the first OFDM symbol(s) in each subframe and spans over the whole system bandwidth. A user equipment that has decoded downlink control information, carried by a PDCCH, knows which resource elements in the subframe that contain data aimed for the user equipment. In LTE, data is carried by the physical downlink shared channel (PDSCH).

Demodulation of sent data requires estimation of the radio channel which is done by using transmitted reference symbols, i.e. symbols known by the receiver. In LTE, cell specific reference symbols are transmitted in all downlink subframes and in addition to assist downlink channel estimation they are also used for mobility measurements performed by the user equipments. LTE supports also user equipment specific reference symbols aimed only for assisting channel estimation for demodulation purposes.

The length of the control region, which can vary on subframe basis, is conveyed in a Physical Control Format Indicator CHannel (PCFICH). The PCFICH is transmitted within control region, at locations known by user equipments. After a user equipment has decoded the PCFICH, it thus knows the size of the control region and in which OFDM symbol the data transmission starts.

Also transmitted in the control region is the Physical Hybrid-ARQ Indicator Channel. This channel carries Acknowledgement/Negative Acknowledgment (ACK/NACK) responses to a user equipment to inform if the uplink data transmission in a previous subframe was successfully decoded by the base station or not.

Before an LTE user equipment can communicate with an LTE network it first has to find and acquire synchronization to a cell within the network, i.e. performing cell search. Then it has to receive and decode system information needed to communicate with and operate properly within the cell, and finally access the cell by means of the so-called random-access procedure.

FIG. 3 depicts uplink and downlink coverage in a mixed cell scenario. In order to support mobility, a user equipment needs to continuously search for, synchronize to, and estimate the reception quality of both its serving/camping cell and neighbor cells. The reception quality of the neighbor cells, in relation to the reception quality of the current cell, is then evaluated in order to conclude if a handover for user equipments in connected mode, or cell re-selection for user equipments in idle mode, should be carried out. The procedure for changing cell depends on which of the two Radio Resource Control (RRC) states a user equipment is in: connected mode or idle mode. In idle mode, mobility is controlled by the user equipment, referring to cell re-selection, whereas in connected mode mobility is controlled by the network, referring to handover. For user equipments in connected mode, the handover decision is taken by the network based on measurement reports provided by the user equipment. Examples of such reports are Reference Signal Received Power (RSRP) and Reference Signal Received Quality (RSRQ). Depending on how these measurements, possibly complemented by a configurable offset, are used the user equipment can be connected to the cell with the strongest received power, or the cell with the best path gain, or a combination of the two. These do not result in the same selected cell as the base station output powers of cells of different type are different. This is sometimes referred to as link imbalance. For example, the output power of a pico base station or a relay is in the order of 30 dBm or less, while a macro base station can have an output power of 46 dBm. Consequently, even in the proximity of the pico cell, the downlink signal strength from the macro cell can be larger than that of the pico cell. From a downlink perspective, it is better to select cell based on based on downlink received power, whereas from an uplink perspective, it would be better to select cell based on the path loss. The cell selection approaches are illustrated in FIG. 3.

Hence, in the above scenario, it might be a better case, from a system perspective to connect to the pico cell even if the macro downlink is much stronger than the pico cell downlink. However, ICIC across layers would be needed when a user equipment 300 operate within the region of the UL border and the DL border, i.e. the link imbalance zone 310 depicted in FIG. 3.

A user equipment in connected mode may be requested by the base station to perform Channel State Information (CSI) reporting, e.g., reporting a suitable Rank Indicator (RI), one or more Precoding Matrix Indices (PMIs) and a Channel Quality Indicator (CQI). A CQI report reflects the instantaneous radio quality in a certain downlink subframe observed by the user equipment whereas RI and PMI reports provide the network with user equipment suggestions of parameter settings for Multiple-Input Multiple-Output (MIMO) transmissions. Other types of CSI are also conceivable including explicit channel feedback and interference covariance feedback.

SUMMARY

It is an object of embodiments herein to improve the mechanism of CSI reporting.

According to a first aspect of embodiments herein, the object is achieved by a method in a user equipment for reporting Channel State Information, CSI. The user equipment is in connection with a base station in a cellular communication network. The user equipment receives from the base station a grant in a subframe n to be used for CSI reporting. Next, the user equipment determines a subframe type of a subframe n+p. The user equipment then reports CSI to the base station. The CSI reflects channel conditions in the subframe type of subframe n+p. p is a variable value.

According to a second aspect of embodiments herein, the object is achieved by a method in a base station for obtaining CSI from a user equipment, which base station is comprised in a cellular communication network 400. The base station provides the user equipment with a grant in a subframe n to be used for CSI reporting. Next, the base station receives CSI from the user equipment, reflecting channel conditions in a subframe type of subframe n+p, where p is a variable value.

According to a third aspect of embodiments herein, the object is achieved by an arrangement in a user equipment adapted to communicate with a base station in a cellular communication network. The user equipment is capable of reporting CSI to said base station. The arrangement comprises processing circuitry configured to receive from the base station, a grant in a subframe n to be used for CSI reporting; and to determine subframe type of a subframe n+p. The processing circuitry is further configured to report to the base station, CSI reflecting channel conditions in a subframe type of subframe n+p. is a variable value.

According to a fourth aspect of embodiments herein, the object is achieved by an arrangement in a base station capable of obtaining CSI from a user equipment. The base station is to be comprised in a cellular communication network. The arrangement comprises processing circuitry configured to provide the user equipment with a grant in a subframe n to be used for CSI reporting, and to receive from the user equipment CSI reflecting channel conditions in a subframe type of subframe n+p. p is a variable value.

Since the user equipment can determine the subframe type of the subframe n+p from the received grant in a subframe n, and can report CSI reflecting channel conditions in the subframe type of subframe n+p, there is no need to extend CSI report grants with further bits in order to report radio conditions in different types of subframes, which results in an improved mechanism of CSI reporting in terms of less overhead.

BRIEF DESCRIPTION OF THE DRAWINGS

Examples of embodiments herein are described in more detail with reference to attached drawings in which:

FIG. 6 is a schematic block diagram illustrating embodiments in a cellular communications network.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Figure 1:
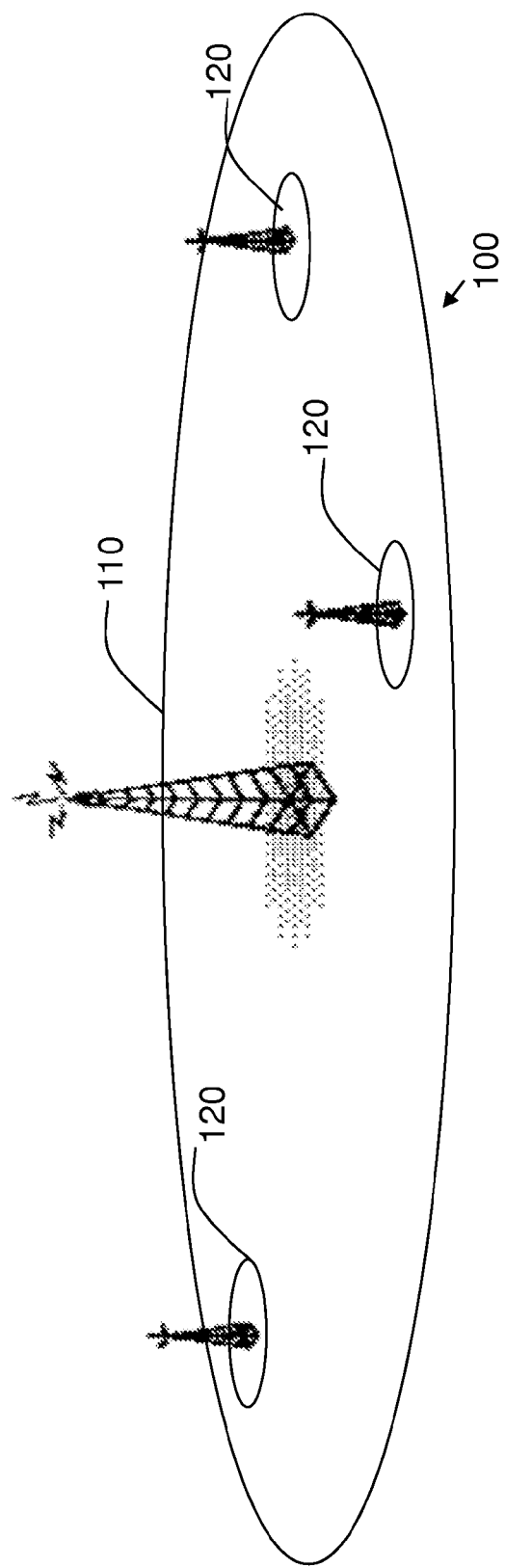
FIG. 1 is a schematic block diagram illustrating prior art.
Figure 2:
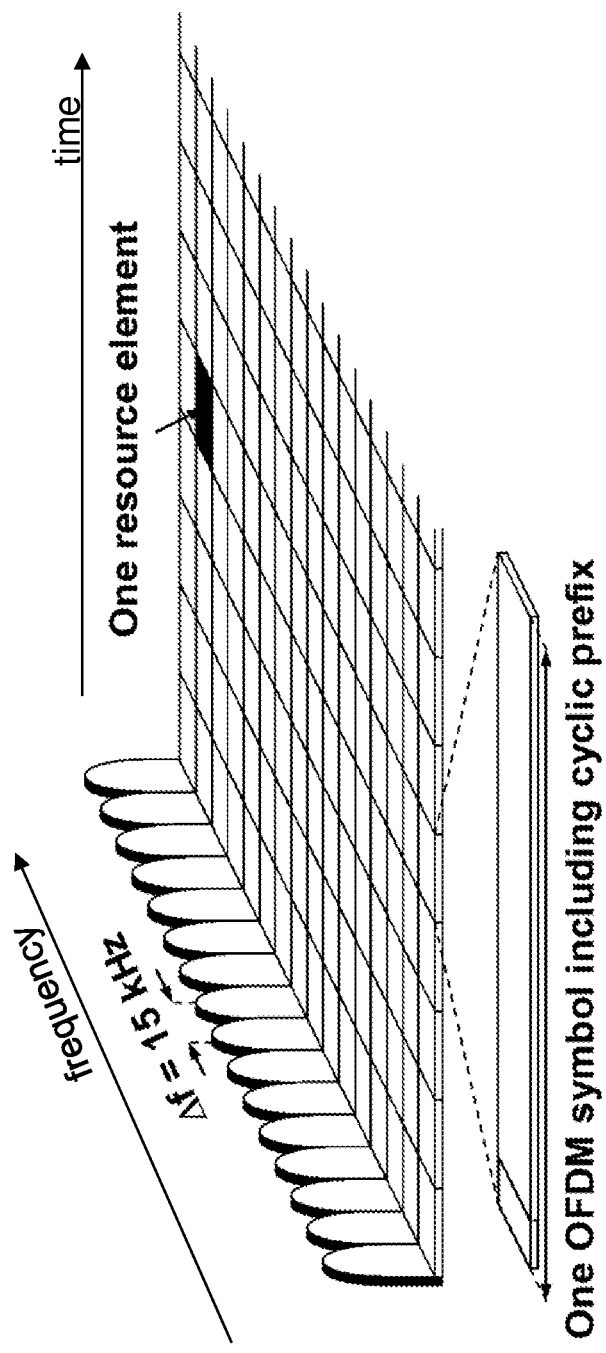
FIG. 2 is a schematic block diagram illustrating prior art.
Figure 3:
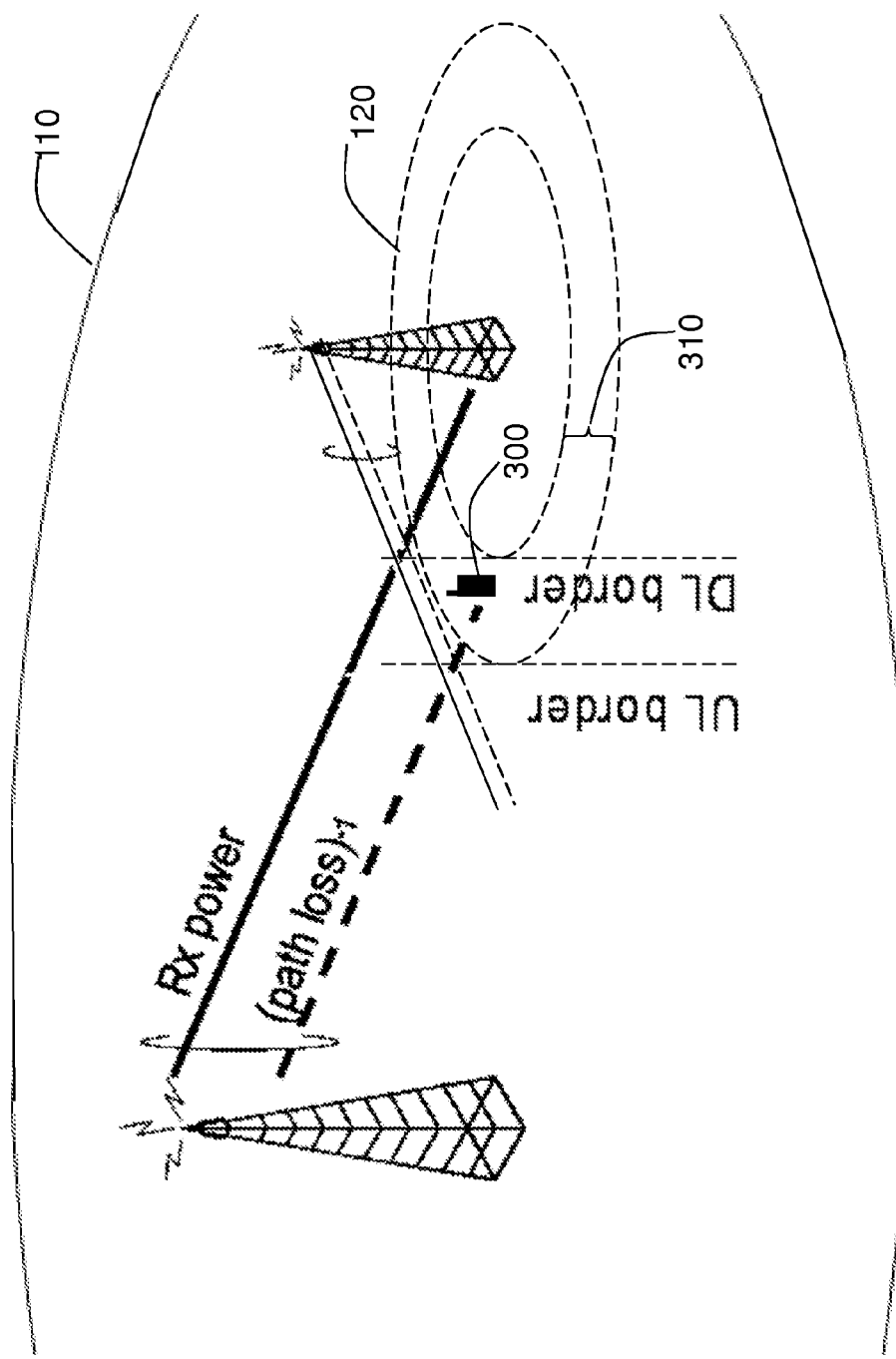
FIG. 3 is a schematic block diagram illustrating prior art.
Figure 4:
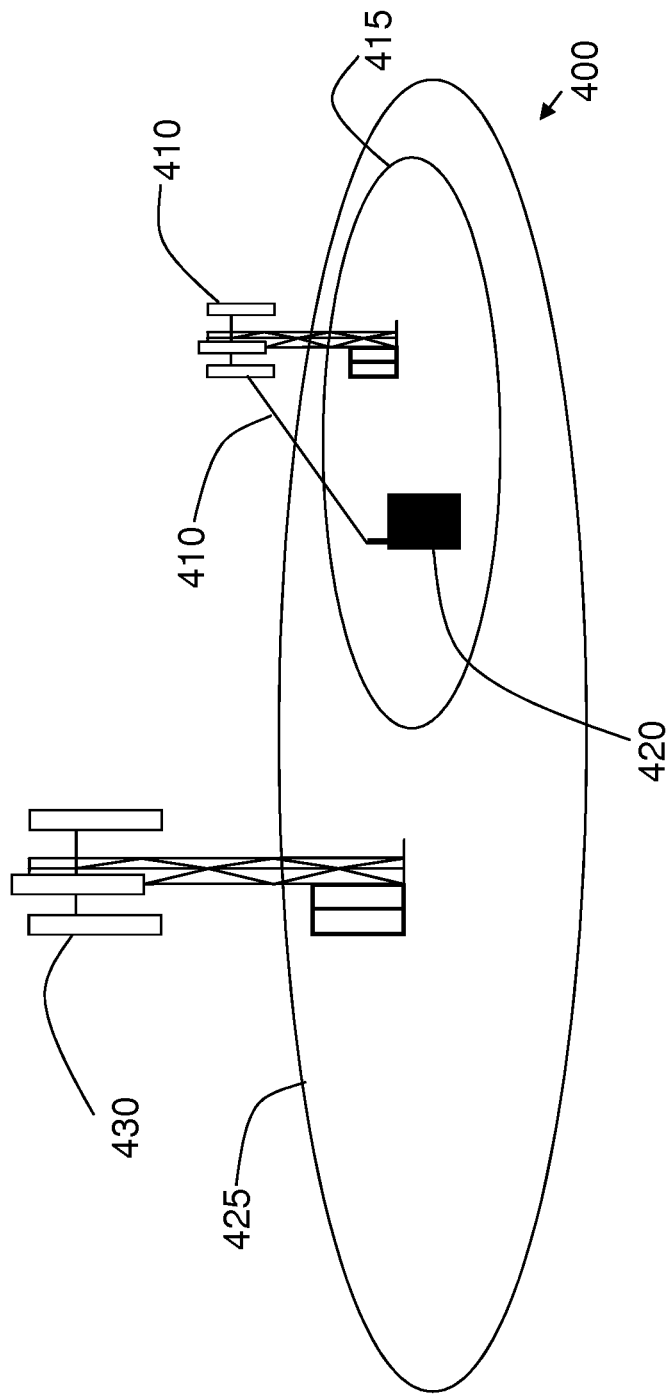
FIG. 4 is a schematic block diagram illustrating embodiments of a cellular communication network.

FIG. 4 depicts a cellular communications network 400 in which embodiments herein may be implemented. The cellular communications network 400 is a cellular communication network such as an LTE, WCDMA, GSM network, any other 3GPP cellular network, or any cellular network or system. The cellular communications network 400 may be a heterogeneous network comprising cells served by respective base stations with large difference in output power. One example of such heterogeneous network is where pico cells are deployed within the coverage area of a macro cell. A pico cell is a small cellular base station typically covering a small area. A pico cell is typically covering a much smaller geographical area in comparisons with the macro cell.

The cellular communications network 400 comprises a base station 410. The base station 410 may be a low power base station, such as e.g. a pico base station also referred to as a pico eNB, a home base eNB, a relay or any other low power base station capable to serve a user equipment in a cellular communications system. Transmit power of a low power base station is typically in the range of 10 dB to 25 dB lower than the transmit power of a macro base station. The base station 410 may also be denoted as PeNB when exemplifying a low power base station as being a pico base station. The base station 410 is a radio base station serving a cell 415. The cell 415 may e.g. be a micro cell, or a pico cell or any other low power cell such as e.g. a femto cell.

A user equipment 420 is located within the cell 415. The user equipment 420 is configured to communicate within the cellular communications network 400 via the base station 410 over a radio link 430 when the user equipment 420 is present in the cell 415 served by the base station 410.

In the example of FIG. 4, the cellular communications network 400 further comprises a cell neighbour to the cell 415, and is therefore referred to as the neighbour cell 425. The neighbour cell 425 is served by a macro base station 430. In this example the neighbour cell 425 is served by a macro base station 430 with larger coverage area than the cell 415 served by the low power base station 410. In this example, the cell 415 is deployed within the coverage area of the neighbour cell 425. The macro base station 425 may also be referred to as MeNB.

CSI Reporting

Figure 5:
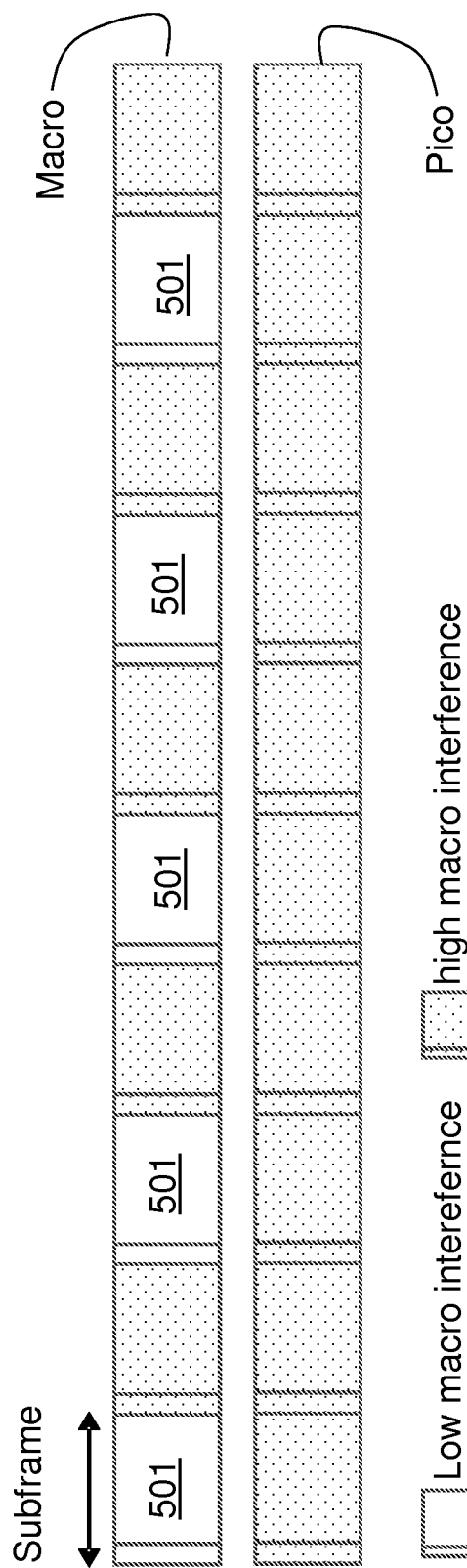
FIG. 5 is a schematic block diagram illustrating embodiments in a cellular communications network.

One example of providing ICIC across layers is illustrated in FIG. 5. In this scenario the neighbour cell 425 is interfering cell 415, i.e. downlink interference towards the cell 415. The macro base station 430 may avoid scheduling user equipments that it serves (not shown) in certain subframes 501 implying that neither PDCCHs nor PDSCH occur in those subframes. In this way, it is possible to create low interference subframes, which may be used to protect the user equipment 420 when it operates in an link imbalance zone. In LTE, an interface referred to as the X2 interface is used to interconnect base stations and inter-cell messages are sent via the X2 Application Protocol (X2-AP). The macro base station 430 may indicate via the backhaul interface X2 to the base station 410 which subframes the macro base station 430 will avoid scheduling user equipments within. The message carried by the X2-AP is typically represented by a bitmap indicating the subframes the macro base station 430 intend to avoid scheduling user equipments within. The base station 410 will then take this information into account when scheduling user equipments such as the user equipment 420, when operating within the link imbalance zone, i.e. within the cell 415, but outside the DL border. This may be performed such that these user equipments are scheduled in subframes aligned with, i.e. associated with the low interference subframes at the macro layer, i.e. in interference protected subframes. However, user equipments when operating within the DL border may be scheduled in all subframes, i.e. in both protected and non-protected subframes.

When the user equipment 420 operates in connected mode, it may be requested by the base station 410 to perform Channel State Information (CSI) measurements. With the feedback of reported CSI, the base station 410 may decide upon a certain transmission scheme as well as on a proper user equipment bit rate for a transmission when scheduling the user equipment 420 in downlink. In LTE, both periodic, i.e. at regular intervals, and aperiodic i.e. not recurring at regular intervals, CSI reporting is supported. In the case of periodic CSI reporting, the user equipment 420 may report the CSI measurements on a configured periodical time basis on e.g. an Physical Uplink Control Channel (PUCCH), whereas with aperiodic reporting the CSI feedback may be transmitted on the Physical Uplink Shared Channel (PUSCH) at pre-specified time instants after receiving the CSI grant from the base station. According to embodiments herein, the base station 410 may request CSI reflecting downlink radio conditions in a particular subframe using aperiodic CSI reports.

In order to obtain accurate CSI measurements, the user equipment 420 may typically average interference measurements over many subframes. A general principle is that measurements shall reflect radio conditions in subframes in which the user equipment 420 is supposed to be scheduled. When the user equipment 420 is served by the cell 415 and operates in the link imbalance zone, it preferably only performs measurements in subframes that are aligned with the low interference subframes, i.e. the protected subframes. Hence, if also including high interference subframes in the CSI measurements, the CSI report would not reflect the radio conditions in subframes to be scheduled within, resulting in degraded system operations. FIG. 6 depicts the base station 410 serving the user equipment 420 in a first scenario when the user equipment is located within the DL border 610, in this scenario the user equipment 420 is referred to as 420-1. FIG. 6, further depicts the base station 410 serving the user equipment 420 in a second scenario when the user equipment is located outside the DL border 610, in this scenario the user equipment 420 is referred to as 420-2. The macro base station 430 being neighbour to the base station 410, is operating with protected subframes in order to reduce interference towards the user equipments operating in the link imbalance zone, i.e. within the cell 415, but outside the DL border 610.

I. e. in this scenario the user equipment 420-1 located in the cell 415 is in the vicinity of the base station 410, i.e. within the DL border 610 and may thus be scheduled in all subframes.

The user equipment 420-2 located in the edge of the cell 415, i.e. outside the DL border 610, faces high interference from the neighbour macro base station 430. In this scenario, the user equipment 420-2 located in the edge of the cell 415 is preferably scheduled in the protected subframes only, i.e. in subframes with low macro interference in DL.

User equipments operating in link imbalance cells, e.g. pico cells, may either be scheduled in all subframes or in subframes aligned with, i.e. associated with low interference subframes i.e. the protected subframes only, depending on their location within the cell. In order for the base stations to make good scheduling decisions, CSI measurements for both protected and non-protected subframes are needed. A base station controls which subframe to send a grant in and may then request a CSI report reflecting channel conditions either in a protected subframe or in a non-protected subframe.

Some embodiments herein provides a procedure on how to differentiate the measurements for aperiodic CSI reporting depending on the type of subframe in which the user equipment 420 receives a corresponding measurement grant. If there are two types of defined subframes, e.g. subframe type "A" and "B", for CSI measurement purposes, the following procedure may e.g. apply.

If a CSI reporting grant is received by the user equipment 420 in a downlink subframe corresponding to type "A", the CSI report shall be based on measurements reflecting the radio conditions in subframes of type "A" only.

If a CSI reporting grant is received by the user equipment 420 in a downlink subframe corresponding to type "B", the CSI report shall be based on measurements reflecting the radio conditions in subframes of type "B", or in a complementary set of subframes to the subframes of type "A".

The subframe type "A" may correspond to a protected subframe, whereas subframe type "B" may correspond to a non-protected subframe. The above principle may be extended to more than two subframe types. Generalizations of this concept comprises that the subframe in which the CSI reporting grant occurs in may determine the type of subframes for which measurements for the associated CSI report shall reflect channel conditions.

Alternatively, the CSI itself instead of the measurements may reflect the channel conditions of a subframe of a certain type. For example, the CQI/CSI reference resource could be tied to a subframe of a specific type based on the timing of the CSI reporting grant.

In the text below, embodiments herein will first be described seen from the perspective of the user equipment 420 and secondly described seen from perspective of the base station 410.

Figure 7:
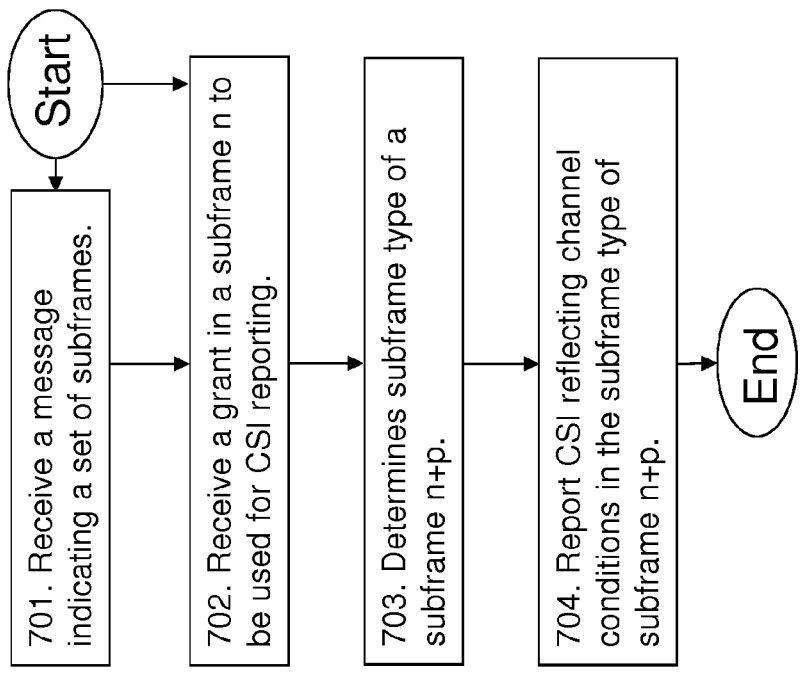
FIG. 7 is a flowchart depicting embodiments of a method in a user equipment.

Embodiments of a method in user equipment 420 for reporting CSI will now be described with reference to the flowchart depicted in FIG. 7. As mentioned above, the user equipment 420 is in connection with the base station 410 in the cellular communication network 400. The method comprises the following actions, which actions may as well be carried out in another suitable order than described below.

Action 701

In some embodiments, a subframe type of subframe n+p is one of two or more subframe types. The two or more subframe types are associated with a respective set of different subframes. A set of subframes contains subframes of same subframe type. In these embodiments, the user equipment 420 may receive a message from the base station 410. The message indicates the set of subframes.

In some embodiments the set of subframes comprises a subset of protected subframes aligned with low interference created by a neighbour cell.

For example, the user equipment 420 being served by the base station 410 may receive a message regarding a set of restricted subframes to take into account in the CSI measurements. This message may e.g. be broadcasted or be sent dedicated from the base station 410 to the user equipment 420. Typically the message corresponds to a high layer message, such as an RRC message. The set of restricted subframes may e.g. represent all protected subframes, i.e. subframes aligned with low interference subframes created by the neighbor cell, or correspond to a subset of the protected subframes. The cellular communication network 400 may via base station 410 also broadcast, or send dedicated to the user equipment 420, additional higher layer messages comprising of sets of restricted subframes indicating subframes for complementary CSI measurement purposes. One example of a complementary set of subframes to the signalled set of restricted subframes is the non-protected subframes. The set or sets of restricted subframes for certain CSI measurement purposes, signalled by the cellular communication network 400, may e.g. be represented by one bitmap per set, where one bit may e.g. represents one subframe within a radio frame, or a subframe within several radio frames. The set or sets of restricted subframes may have a start and stop time, and may be repeated periodically until the cellular communication network 400 reconfigure the set or sets of restricted subframes.

Action 702

The user equipment 420 receives from the base station 410, a grant in a subframe n to be used for CSI reporting.

For example, the base station 410 may have sent the grant in subframe n to the user equipment 420 for requesting an aperiodic CSI report to be sent by the user equipment 420 in subframe n+k.

Action 703

The user equipment 420 determines subframe type of a subframe n+p.

For example, the user equipment 420 receives and detects the CSI reporting grant in subframe n.

If the subframe n+p corresponds to a subframe of type "A", the user equipment 420 shall report CSI reflecting radio conditions in subframes that the cellular communication network 400 e.g. via higher layer signalling indicates as being associated with subframes of type "A".

If the subframe n corresponds, possibly via a known timing relation, to a subframe of type "B", the user equipment 420 shall report CSI reflecting radio conditions in subframes indicated by the cellular communication network 400, e.g. via higher layer signaling as being associated with subframes of type "B".

This may be generalized to more than two subframe types. With each subframe type (A, B, C, . . . ), there may be an associated set of subframes. The CSI report shall in these embodiments reflect the radio conditions in the subframes belonging to the associated set of subframes.

Action 704

The user equipment 420 reports to the base station 410, CSI reflecting channel conditions in the subframe type of subframe n+p, where p is a variable value.

In some embodiments, p is a variable value known both to the cellular communication network 400 and the user equipment 420.

In some embodiments, the subframe type of subframe n+p is one of two or more subframe types. The two or more subframe types are associated with the respective set of different subframes. In these embodiments, this action of reporting CSI may reflect channel conditions in the subframes belonging to the set of subframes associated to the subframe type of subframe n+p. In some embodiments, the value p is equal to zero, but as mentioned above, other values or functions known to both the cellular communications network 400 and the user equipment 420 are possible. The value of p could e.g. be implicitly determined from the subframe n following some pre-determined rules. When p is equal to zero, it is the subframe type of the subframe in which the grant is received by the user equipment 420 that determines the subframe type for which channel conditions should be reflected in the CSI reporting.

This action of reporting of CSI may be aperiodic or periodic.

In some embodiments the set of subframes comprises a subset of protected subframes aligned with low interference created by a neighbour cell.

With embodiments herein, there would be no need to extend the CSI report grants with further bits in order to report radio conditions in different types of subframes. The same fundamental CSI signalling mechanisms as used in LTE Rel-8 may be reused, with an additional implicit principle on how to perform measurements for CSI feedback in heterogeneous network operations with link imbalance zones.

In some embodiments the subframe type of subframe n+p is represented by a first subframe type corresponding to a protected subframe. The first subframe type is associated with a set of subframes comprising protected subframes aligned with low interference created by the neighbor cell. In some embodiments, the subframe type of subframe n+p may be represented by a second subframe type corresponding to a non-protected subframe, which second subframe type is associated with a set of subframes comprising non-protected subframes, which non-protected subframes are subframes that are not part of protected subframes aligned with low interference created by a neighbour cell.

For example, the base station 410 sends a grant in subframe n to the user equipment 420 for requesting an aperiodic CSI report to be sent by the user equipment 420 in subframe n+k. The user equipment 420 receives and detects the CSI reporting grant in subframe n. k is a non-negative integer and p represents an arbitrary integer, negative, positive values including zero.

If the subframe n+p corresponds to a protected subframe, the user equipment 420 shall report CSI based on measurements reflecting channel conditions in subframes, i.e. a first set of subframes, that have been indicated by the cellular communication network 400 e.g. via higher layer signalling as protected subframes.

If the subframe n+p corresponds to a non-protected subframe, the user equipment 420 shall report CSI reflecting channel conditions in subframes, i.e. a second set of subframes, that are not part of the first set of restricted subframes that have been indicated by the cellular communication network 400 e.g. via higher layer signalling as protected subframes.

The user equipment 420 does not need to know if the first set of subframes refer to protected subframes or non-protected subframes. The user equipment 420 reports channel conditions linked to either the first set or the second set, depending on which set the grant belongs to.

The value p is in particular embodiments equal to zero but other values or functions, known to both the cellular communication network 400 and the user equipment 420, may also be envisioned. The subframe in which the CSI reporting grant occurs in may determine the type of subframes for which measurements for the associated CSI report shall reflect channel conditions.

In some other embodiments, the subframe type of subframe n+p is represented by a first subframe type corresponding to a protected subframe. The first subframe type is associated with a set of subframes indicated as protected in the message from the base station 410. In some embodiments, the subframe type of subframe n+p may be represented by a second subframe type corresponding to a non-protected subframe, which second subframe type is associated with a set of subframes being indicated as complementary in the message from the base station 410.

For example, the base station 410 may send a grant in subframe n to the user equipment 420 for requesting an aperiodic CSI report to be sent by the user equipment 420 in subframe n+k. The user equipment 420 receives and detects the CSI reporting grant in subframe n.

- If the subframe n+p corresponds to a protected subframe, the user equipment 420 shall report CSI based on measurements reflecting channel conditions in subframes that have been indicated by the cellular communication network 400 e.g. via higher layer signalling as protected subframes.
- If the subframe n+p corresponds to a non-protected subframe, the user equipment 420 shall report CSI reflecting channel conditions in subframes in a complementary set of subframes indicated by the cellular communication network 400 via higher layer signalling as the complementary subframes.

If the base station 410 has sent a grant in subframe n, corresponding to a non-protected subframe n+p, and has not received CSI report in subframe n+k, the base station 410 may expect, or conclude, that the user equipment 420 being requested to send a CSI report in subframe n+k is within the link imbalance zone and is not able to detect PDCCH in non-protected subframes. The base station 410 may then send a CSI reporting grant to the user equipment 420 in a protected subframe.

Figure 8:
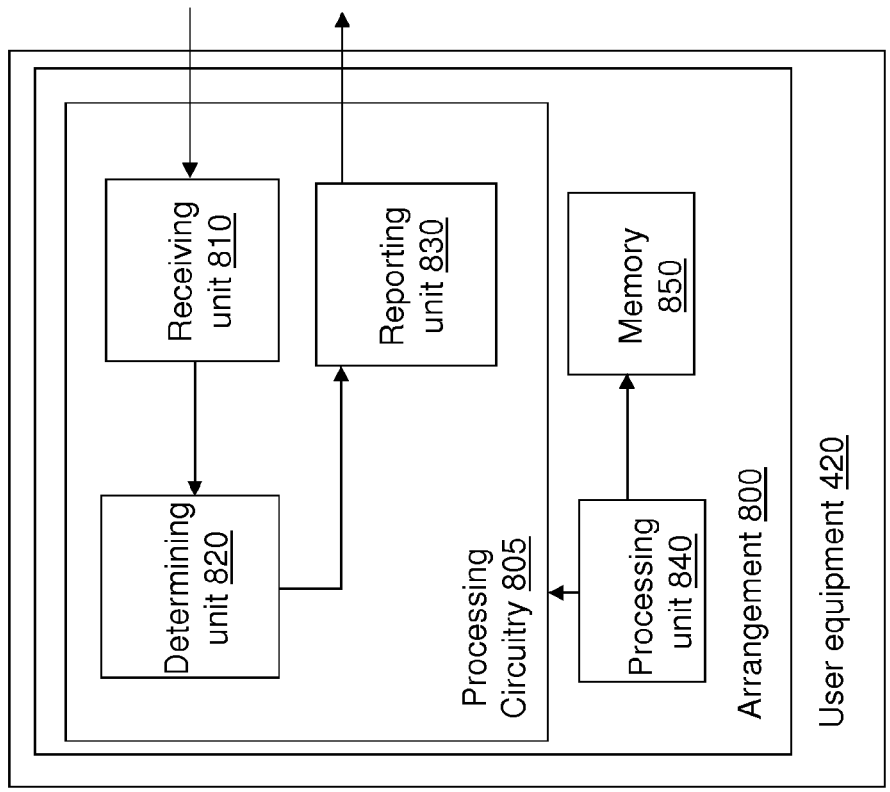
FIG. 8 is a schematic block diagram illustrating embodiments of an arrangement in a user equipment.

To perform the method actions in the user equipment 420 described above, the user equipment 420 comprises the following arrangement 800 depicted in FIG. 8. As mentioned above, the user equipment 420 is adapted to communicate with a base station 410 in the cellular communication network 400. The user equipment 420 is further capable of reporting channel state information to the base station 410.

The arrangement 800 comprises processing circuitry 805 configured to receive from the base station 410, a grant in a subframe n to be used for CSI reporting. For this function, the processing circuitry 805 may comprise a receiving unit 810.

The arrangement 800 comprises processing circuitry 805 configured to determine subframe type of a subframe n+p. For this function, the processing circuitry 805 may comprise a determining unit 820.

In some embodiments, the subframe type of subframe n+p may be represented by a first subframe type corresponding to a protected subframe. The first subframe type is associated with a set of subframes comprising protected subframes aligned with low interference created by a neighbour cell. In some embodiments, the subframe type of subframe n+p may be represented by a second subframe type corresponding to a non-protected subframe. The second subframe type is associated with a set of subframes comprising non-protected subframes. The non-protected subframes are subframes that are not part of protected subframes aligned with low interference created by a neighbour cell.

In some embodiments, the subframe type of subframe n+p is represented by a first subframe type corresponding to a protected subframe. The first subframe type is associated with a set of subframes indicated as protected in the message from the base station 410. In some embodiments, the subframe type of subframe n+p may be represented by a second subframe type corresponding to a non-protected subframe. The second subframe type is associated with a set of subframes being indicated as complementary in the message from the base station 410.

The processing circuitry 805 is further configured to report to the base station 410, CSI reflecting channel conditions in the subframe type of subframe n+p, where p is a variable value. In some embodiments, p is a variable value known both to the cellular communication network and the user equipment 420. For this function, the processing circuitry 805 may comprise a reporting unit 830. The value p may e.g. be equal to zero, but other values or functions known to both the cellular communications network 400 and the user equipment 420 are possible. When p is equal to zero, it is the subframe type of the subframe in which the grant is received by the user equipment 420 that determines the subframe type for which channel conditions should be reflected in the CSI reporting.

In some embodiments, the processing circuitry 805 such as e.g. the reporting unit 830, further is configured to report CSI aperiodic.

In some embodiments, the subframe type of subframe n+p is one of two or more subframe types, which two or more subframe types are associated with a respective set of different subframes. In these embodiments the processing circuitry 805, such as e.g. the reporting module 830, may further be configured to report CSI reflecting channel conditions in the subframes belonging to the set of subframes associated to the subframe type of subframe n+p.

In some embodiment, the processing circuitry 805, such as e.g. the receiving unit 810, further is configured to receive a message from the base station 410, which message indicates the set of subframes.

In some embodiments, the set of subframes comprises a subset of protected subframes aligned with low interference created by a neighbour cell.

The arrangement 800 in the user equipment 420 comprises according to some embodiments a processing unit 840, e.g. with a DSP (Digital Signal Processor) and an encoding and a decoding module. The processing unit 840 may be a single unit or a plurality of units to perform different steps of procedures described herein. The arrangement 800 also comprises an input unit and an output unit. The input unit and the output unit may be arranged as one unit or as separate units in the hardware of the arrangement 800 in the user equipment 420.

Furthermore the arrangement 800 may comprise at least one computer program product in the form of a non-volatile memory 850, e.g. an EEPROM, a flash memory and a disk drive. The computer program product comprises a computer program, which comprises code means which when run on the processing unit 840 causes the arrangement 800 in the user equipment to perform the steps of the procedures described earlier.

Hence in the exemplary embodiments described, the code means in the computer program of the arrangement 800 in the user equipment comprises a module for receiving a grant in a subframe n to be used for CSI reporting, in specific embodiments a module for obtaining a value p, a module for determining the subframe type of a subframe n+p and a module for reporting CSI reflecting channel conditions in the subframe type for subframe n+p in the form of computer program code structured in computer program modules.

Furthermore the arrangement 800 may comprise at least one computer program product in the form of a non-volatile memory, e.g. an EEPROM, a flash memory and a disk drive. The computer program product comprises a computer program, which comprises code means which when run on the processing unit causes the arrangement 800 in the user equipment to perform the steps of the procedures described earlier.

Hence in the exemplary embodiments described, the code means in the computer program of the arrangement 800 in the base station comprises a module for providing the user equipment 420 with a grant in a subframe n to be used for CSI reporting, in specific embodiments a module for obtaining a value p and a module for receiving CSI from the user equipment reflecting channel conditions in a subframe type of subframe n+p in the form of computer program code structured in computer program modules.

The present invention may, of course, be carried out in other ways than those specifically set forth herein without departing from essential characteristics of the invention. The present embodiments are to be considered in all respects as illustrative and not restrictive.

Figure 9:
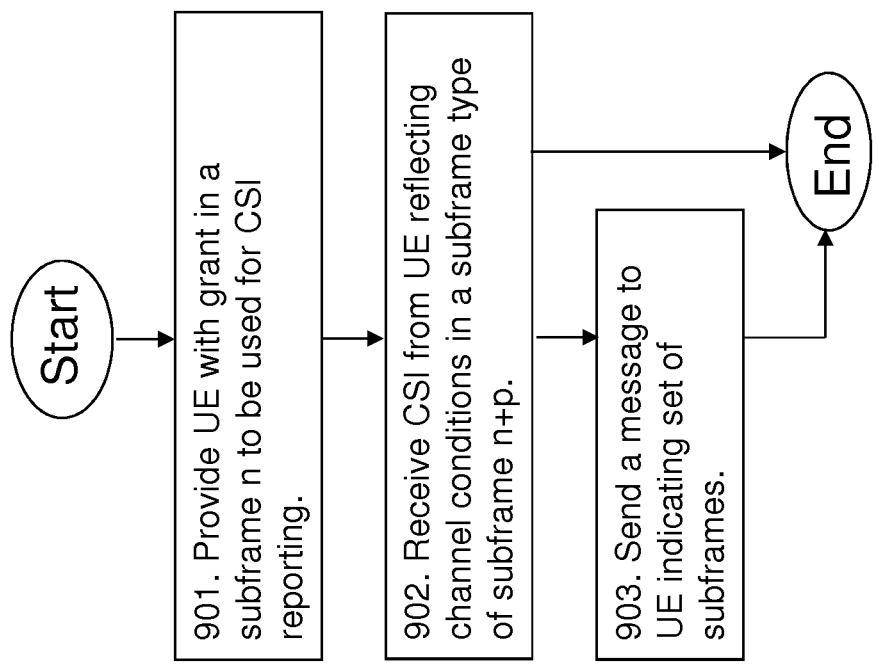
FIG. 9 is a flowchart depicting embodiments of a method in a base station.

Embodiments of a method in the base station 410 for obtaining CSI from a user equipment 420, will now be described with reference to the flowchart depicted in FIG. 9. As mentioned above, the base station 410 is comprised in a cellular communication network 400.

In some embodiments, the base station 410 is represented by a low power node serving a first cell, such as the cell 415. In this case the cell 415 is represented by the first cell. The first cell is comprised in the neighbour cell 425 represented by a macro cell which is served by a macro base station. In this case the neighbour base station is represented by the macro base station. In this case the neighbour base station 425 is represented by the macro base station. The first cell and the macro cell share radio resources on the same carrier frequencies.

In some embodiments, the base station 410 is represented by a pico base station serving a pico cell. In this case the cell 415 is represented by the pico cell. The pico cell is comprised in the neighbour cell 425 represented by a macro cell which is served by a macro base station. In this case the neighbour base station 425 is represented by the macro base station. The pico cell and the macro cell share radio resources on the same carrier frequencies.

The method comprises the following actions, which actions may as well be carried out in another suitable order than described below.

Action 901

The base station 410 provides the user equipment 420 with a grant in a subframe n to be used for CSI reporting.

Action 902

The base station 410 receives CSI from the user equipment 420, reflecting channel conditions in a subframe type of subframe n+p, where p is a variable value. In some embodiments, p is a variable value known both to the network and the user equipment 420. The value p may e.g. be equal to zero, but other values or functions known to both the cellular communications network 400 and the user equipment 420 are possible. When p is equal to zero, it is the subframe type of the subframe in which the grant is received by the user equipment 420 that determines the subframe type for which channel conditions should be reflected in the CSI reporting.

The subframe type of subframe n+p may be one of two or more subframe types. The two or more subframe types are associated with a respective set of different subframes. The received CSI from the user equipment 420 reflects channel conditions in the subframes belonging to the set of subframes associated to the subframe type of subframe n+p.

Action 903

The base station 410 may send a message to the user equipment 420, which message indicates the set of subframes.

In some embodiments, the subframe type of subframe n+p is represented by a first subframe type corresponding to a protected subframe. The first subframe type is associated with a set of subframes comprising protected subframes aligned with low interference created by a neighbour cell. In some embodiments, the subframe type of subframe n+p is represented by a second subframe type corresponding to a non-protected subframe. The second subframe type is associated with a set of subframes comprising non-protected subframes. The non-protected subframes are subframes that are not part of protected subframes aligned with low interference created by a neighbour cell.

In some other embodiments, the subframe type of subframe n+p is represented by a first subframe type corresponding to a protected subframe, which first subframe type is associated with a set of subframes indicated as protected in the message to the user equipment 420. In some embodiments, the subframe type of subframe n+p may be represented by a second subframe type corresponding to a non-protected subframe, which second subframe type is associated with a set of subframes being indicated as complementary in the message to the user equipment 420.

The set of subframes may comprise a subset of protected subframes aligned with low interference created by a neighbour cell.

Figure 10:
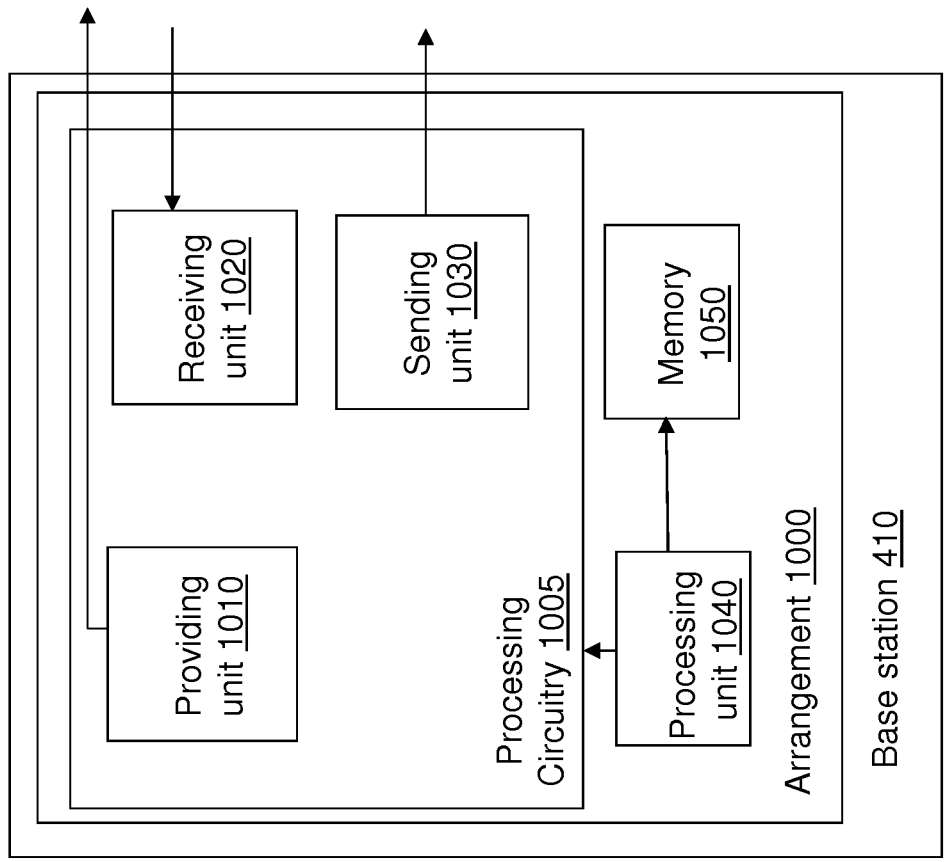
FIG. 10 is a schematic block diagram illustrating embodiments of an arrangement in a base station.

To perform the method actions in the base station 410 described above for obtaining CSI from a user equipment 420 the base station 410 comprises the arrangement 1000 depicted in FIG. 10. The base station 410 is capable of obtaining CSI from the user equipment 420. The base station 410 is to be comprised in a cellular communication network.

In some embodiments, the base station 410 is represented by a low power node serving a first cell, such as the cell 415. In this case the cell 415 is represented by the first cell. The first cell is comprised in the neighbour cell 425 represented by a macro cell which is served by a macro base station. In this case the neighbour base station is represented by the macro base station. In this case the neighbour base station 425 is represented by the macro base station. The first cell and the macro cell share radio resources on the same carrier frequencies.

In some embodiments, the base station 410 is represented by a pico base station serving a pico cell. In this case the cell 415 is represented by the pico cell. The pico cell is comprised in the neighbour cell 425 represented by a macro cell which is served by a macro base station. In this case the neighbour base station 425 is represented by the macro base station. The pico cell and the macro cell share radio resources on the same carrier frequencies.

The arrangement 1000 in the base station 410 comprises processing circuitry 1005 configured to provide the user equipment 420 with a grant in a subframe n to be used for CSI reporting. For this function, the processing circuitry 1005 may comprise a providing unit 1010.

The processing circuitry 1005 is further configured to receive CSI from the user equipment 420 reflecting channel conditions in a subframe type of subframe n+p, where p is a variable value. In some embodiments, p is a variable value known both to the network and the user equipment 420. For this function, the processing circuitry 1005 may comprise a receiving unit 1020. The value p may be equal to zero, but as mentioned above, other values or functions known to both the cellular communications network 400 and the user equipment 420 are possible. When p is equal to zero, it is the subframe type of the subframe in which the grant is received by the user equipment 420 that determines the subframe type for which channel conditions should be reflected in the CSI reporting.

According to some embodiments, the subframe type of subframe n+p may be one of two or more subframe types. The two or more subframe types are associated with a respective set of different subframes. In these embodiments, the processing circuitry 1005 such as e.g. the receiving unit 1020 may further be configured to receive CSI from the user equipment 420 reflecting channel conditions in the subframes belonging to the set of subframes associated to the subframe type of subframe n+p.

The set of subframes may comprise a subset of protected subframes aligned with low interference created by a neighbour cell.

In some embodiments, the processing circuitry 1005 may further be configured to send a message to the user equipment 420, which message indicates the set of subframes. For this function, the processing circuitry 1005 may comprise a sending unit 1030.

In some embodiments, the subframe type of subframe n+p is represented by a first subframe type corresponding to a protected subframe which first subframe type is associated with a set of subframes comprising protected subframes aligned with low interference created by a neighbour cell. In some embodiments, the subframe type of subframe n+p may be represented by a second subframe type corresponding to a non-protected subframe. The second subframe type is associated with a set of subframes comprising non-protected subframes. The non-protected subframes are subframes are not part of protected subframes aligned with low interference created by a neighbour cell.

In some other embodiments, the subframe type of subframe n+p is represented by a first subframe type corresponding to a protected subframe, which first subframe type is associated with a set of subframes indicated as protected in the message to the user equipment 420. In some embodiments, the subframe type of subframe n+p may be represented by a second subframe type corresponding to a non-protected subframe, which second subframe type is associated with a set of subframes being indicated as complementary in the message to the user equipment 420.

The arrangement 1000 in the base station 410 comprises according to some embodiments a processing unit 1040 e.g. with a DSP (Digital Signal Processor) and an encoding and a decoding module. The processing unit 1040 may be a single unit or a plurality of units to perform different steps of procedures described herein. The arrangement also comprises an input unit and an output unit. The input unit and the output unit may be arranged as one unit or as separate units in the hardware of the arrangement in the user equipment 420.

Furthermore the arrangement 1000 may comprise at least one computer program product in the form of a non-volatile memory 1050, e.g. an EEPROM, a flash memory and a disk drive. The computer program product comprises a computer program, which comprises code means which when run on the processing unit 1040 causes the arrangement in the base station 410 to perform the steps of the procedures described earlier.

Hence in the exemplary embodiments described, the code means in the computer program of the arrangement 1000 in the base station 410 comprises a module for providing the user equipment 420 with a grant in a subframe n to be used for CSI reporting, in specific embodiments a module for obtaining a value p and a module for receiving CSI from the user equipment reflecting channel conditions in a subframe type of subframe n+p in the form of computer program code structured in computer program modules.

The present invention may, of course, be carried out in other ways than those specifically set forth herein without departing from essential characteristics of the invention. The present embodiments are to be considered in all respects as illustrative and not restrictive.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a user equipment for reporting Channel State Information (CSI) to a base station in a cellular communication network, the method comprising:
   receiving, from the base station, in a subframe n, a grant of uplink resources to be used for CSI reporting,
   determining a subframe type of a subframe n+p, where p is a variable value; and
   reporting, to the base station, CSI that reflects channel conditions in subframes of the determined subframe type;
   wherein the determined subframe type is one of two or more subframe types, each of which two or more subframe types is associated with a respective set of different subframes, and wherein the reported CSI reflects channel conditions particular to subframes belonging to the set of subframes associated with the determined subframe type.

2. The method of claim 1, wherein the value p is equal to zero.

3. The method of claim 1, wherein p is a variable value known both to the cellular communication network and the user equipment.

4. The method of claim 1, further comprising:
   receiving a message from the base station, which message indicates the set of subframes.

5. The method of claim 4, wherein the subframe type is represented by a first subframe type corresponding to a protected subframe, which first subframe type is associated with a set of subframes indicated as protected in the message from the base station.

6. The method of claim 4, wherein the subframe type is represented by a second subframe type corresponding to a non-protected subframe, which second subframe type is associated with a set of subframes being indicated as complementary in the message from the base station.

7. The method of claim 1, wherein the subframe type is represented by a first subframe type corresponding to a protected subframe, which first subframe type is associated with a set of subframes comprising protected subframes aligned with low interference created by a neighbour cell.

8. The method of claim 1, wherein the subframe type is represented by a second subframe type corresponding to a non-protected subframe, which second subframe type is associated with a set of subframes comprising non-protected subframes, which non-protected subframes are subframes that are not part of protected subframes aligned with low interference created by a neighbour cell.

9. The method of claim 1, wherein the set of subframes comprises a subset of protected subframes aligned with low interference created by a neighbour cell.

10. The method of claim 1, wherein the reporting of CSI is aperiodic.

11. A user equipment adapted to communicate with a base station in a cellular communication network, said user equipment being capable of reporting channel state information to said base station and said arrangement comprising processing circuitry configured to:

receive, from the base station, a grant in a subframe n, a grant of uplink resources to be used for CSI reporting;

determine a subframe type of a subframe n+p, where p is a variable value; and report, to the base station, CSI that reflects channel conditions in subframes of the determined subframe type;

wherein the determined subframe type is one of two or more subframe types, each of which two or more subframe types is associated with a respective set of different subframes, and wherein the reported CSI reflects channel conditions particular to subframes belonging to the set of subframes associated with the determined subframe type.

12. The user equipment of claim 11, wherein the value p is equal to zero.

13. The user equipment of claim 11, wherein p is a variable value known both to the cellular communication network and the user equipment.

14. The user equipment of claim 11, wherein the processing circuitry is further configured to receive a message from the base station, which message indicates the set of subframes.

15. The user equipment of claim 14, wherein the subframe type is represented by a first subframe type corresponding to a protected subframe, which first subframe type is associated with a set of subframes indicated as protected in the message from the base station.

16. The user equipment of claim 14, wherein the subframe type is represented by a second subframe type corresponding to a non-protected subframe, which second subframe type is associated with a set of subframes being indicated as complementary in the message from the base station.

17. The user equipment of claim 11, wherein the subframe type is represented by a first subframe type corresponding to a protected subframe, which first subframe type is associated with a set of subframes comprising protected subframes aligned with low interference created by a neighbour cell.

18. The user equipment of claim 11, wherein the subframe type is represented by a second subframe type corresponding to a non-protected subframe, which second subframe type is associated with a set of subframes comprising non-protected subframes, which non-protected subframes are subframes that are not part of protected subframes aligned with low interference created by a neighbour cell.

19. The user equipment of claim 11, wherein the set of subframes comprises a subset of protected subframes aligned with low interference created by a neighbour cell.

20. The user equipment of claim 11, wherein the processing circuitry is further configured to report CSI aperiodically.

* * * * *

UNITED STATES PATENT AND TRADEMARK OFFICE
CERTIFICATE OF CORRECTION

| | | |
|---|---|---|
| PATENT NO. | : 8,868,089 B2 | Page 1 of 1 |
| APPLICATION NO. | : 13/393730 | |
| DATED | : October 21, 2014 | |
| INVENTOR(S) | : Lindbom et al. | |

It is certified that error appears in the above-identified patent and that said Letters Patent is hereby corrected as shown below:

On the title page item 56 under "OTHER PUBLICATIONS", in Column 2, Line 5, delete "Deplayment"," and insert -- Deployment", --, therefor.

In the specification

In Column 5, Line 30, delete "is a" and insert -- p is a --, therefor.

Signed and Sealed this
Sixteenth Day of February, 2016

Michelle K. Lee
*Director of the United States Patent and Trademark Office*